US008848579B1

(12) United States Patent
Reeves et al.

(10) Patent No.: US 8,848,579 B1
(45) Date of Patent: Sep. 30, 2014

(54) METHODS AND SYSTEMS FOR USING TRANSPORT-LAYER SOURCE PORTS TO IDENTIFY SOURCES OF PACKET PAYLOADS IN MIXED TETHERING AND NON-TETHERING ENVIRONMENTS

(75) Inventors: Raymond E. Reeves, Olathe, KS (US); Wen Xue, Overland Park, KS (US); Ryan A. Wick, Apollo Beach, FL (US)

(73) Assignee: Sprint Spectrum L.P., Overland Park, KS (US)

( * ) Notice: Subject to any disclaimer, the term of this patent is extended or adjusted under 35 U.S.C. 154(b) by 118 days.

(21) Appl. No.: 13/550,252

(22) Filed: Jul. 16, 2012

(51) Int. Cl.
*H04L 12/16* (2006.01)
*H04M 15/10* (2006.01)
*H04M 15/00* (2006.01)

(52) U.S. Cl.
CPC .............. *H04M 15/00* (2013.01); *H04M 15/10* (2013.01)
USPC .......................................... 370/271; 709/228

(58) Field of Classification Search
CPC .............................. H04M 15/00; H04M 15/10
USPC ......... 370/221, 228, 259, 271, 310, 315, 329, 370/352, 401; 709/218, 223, 224, 227, 228
See application file for complete search history.

(56) References Cited

U.S. PATENT DOCUMENTS

| | | | | |
|---|---|---|---|---|
| 2009/0274088 | A1* | 11/2009 | Payyappilly et al. | 370/315 |
| 2009/0296568 | A1* | 12/2009 | Kitada | 370/221 |
| 2010/0034081 | A1* | 2/2010 | Yoshimura | 370/228 |
| 2010/0034124 | A1* | 2/2010 | Payyappilly et al. | 370/310 |
| 2010/0088396 | A1* | 4/2010 | Armerding | 709/218 |
| 2011/0158224 | A1* | 6/2011 | Kawauchi et al. | 370/352 |
| 2012/0158930 | A1* | 6/2012 | Kalusivalingam et al. | 709/223 |
| 2012/0246351 | A1* | 9/2012 | Sybesma et al. | 710/16 |
| 2012/0307833 | A1* | 12/2012 | Leu | 370/401 |
| 2013/0016668 | A1* | 1/2013 | Zhao et al. | 370/329 |
| 2013/0159503 | A1* | 6/2013 | Erman et al. | 709/224 |
| 2013/0171964 | A1* | 7/2013 | Bhatia et al. | 455/411 |

* cited by examiner

*Primary Examiner* — Hassan Phillips
*Assistant Examiner* — Ajay Cattungal

(57) ABSTRACT

Disclosed are methods and systems for using transport-layer source ports to identify sources of packet payloads in mixed tethering and non-tethering environments so that, e.g., a provider may differentially bill between those two types of data communication. In particular, a wireless device capable of sending data from both tethered and non-tethered sources may use specified transport-layer source ports to identify data as coming from various different sources. Network entities that record data usage associated with the device may detect which port the device used to send data and use port-to-source (e.g., port-to-hardware-interface) mapping data to determine the source (e.g., the source hardware interface) of the data. The network entities may report this data usage, along with the determined data sources, to a billing system so that the billing system may accordingly differentially bill a subscriber associated with the device.

17 Claims, 5 Drawing Sheets

METHODS AND SYSTEMS FOR USING TRANSPORT-LAYER SOURCE PORTS TO IDENTIFY SOURCES OF PACKET PAYLOADS IN MIXED TETHERING AND NON-TETHERING ENVIRONMENTS

BACKGROUND

Wireless-service providers very often provide their subscribers with access to packet-data networks such as the Internet via wireless communication devices (WCDs) such as cellular phones, smartphones, personal digital assistants (PDAs), tablet computers, laptop computers, air cards, and the like. In addition, and often for an additional fee, some of these providers allow (and enable) their subscribers to extend this data service via their WCDs to one or more additional devices through a feature often referred to as "tethering" (a.k.a. "phone as modem," "phone as router," "mobile hotspot," "personal hotspot," etc.).

In a typical arrangement, and using just one additional ("tethered") device for illustration, the WCD acts as both modem and network-access server (NAS) for the tethered device, and may also act as a Dynamic Host Configuration Protocol (DHCP) server by assigning to the tethered device a local IP address (e.g., 192.168.1.101) on a wireless local-area (e.g., Wi-Fi) network (WLAN) provided by the WCD, which may thereafter receive outbound packets from the tethered device (e.g., a Wi-Fi-enabled tablet) via the WLAN and forward at least the content (payload) of those packets to their addressed destination via the WCD's (e.g., 3 G) data connection to a wireless wide-area (e.g., cellular) network (WWAN). In addition, the WCD may also receive inbound packets addressed to the tethered device from the WWAN and forward at least the content (payload) of those packets to the tethered device via the WLAN.

Such WCDs are often able to facilitate (wired and/or wireless) tethered communication at substantially the same time for multiple tethered devices, which (in addition to tablet computers) could be other WCDs, laptop computers, desktop computers, and/or any other data-communication device(s) capable of establishing and engaging in LAN-based (e.g., WLAN-based) and/or peer-to-peer data communication with the tethering-capable WCD.

OVERVIEW

As explained above, instances of non-tethered communication involve the WCD itself generating the payloads of any outbound data packets; this would typically be carried out by some combination of the WCD's operating system (OS) and one or more applications native to the WCD (and perhaps one or more received user inputs as well). On the other hand, instances of tethered communication involve the corresponding tethered device generating the payloads of any outbound data packets, which the tethered device locally transmits to the WCD; thus, the WCD has relatively little control over the size and nature of such payloads, and the wireless-service provider operating the WWAN has perhaps even less. As such, tethered and non-tethered communications often place differing demands on the resources of the WWAN.

For this and/or perhaps one or more other reasons such as differing levels of consumer demand, it is fairly common for wireless-service providers to bill subscribers for tethered (a.k.a. "off-board") communications in one way (imposing, e.g., a limitation on a total amount of tethered data communication allowed per billing period, perhaps altogether, or perhaps before incurring overage charges, etc.) and to bill subscribers for non-tethered (a.k.a. "on-board" or "native") communications in another way (e.g., allowing unlimited non-tethered data communication each billing period for an agreed-upon flat fee).

Typical wireless-service-provider accounting systems (e.g., packet data serving nodes (PDSNs); data session gateways (DSGs); authentication, authorization, and accounting (AAA) servers, and the like) and their associated data-recordation mechanisms (e.g., usage data records (UDRs)) can tell (and therefore record) when a given WCD is in its tethering (e.g., personal-hotspot-on) mode and when the WCD is in its (typically default) non-tethering (e.g., personal-hotspot-off) mode, typically by being notified by the WCD of activation and deactivation events with respect to tethering mode; accordingly, these systems and mechanisms enable differential billing of subscribers between when their WCD is communicating in tethering mode and when their WCD is communicating in non-tethering mode.

These typical systems and mechanisms cannot, however, distinguish (or, therefore, record or accordingly differentially bill subscribers) based on tethered vs. non-tethered communications when these WCDs are operating in tethering mode (while remaining capable of both tethered and non-tethered data communications). Thus, subscribers are often faced with the undesirable choice between (i) engaging in non-tethered communications while the WCD is in tethering mode, and therefore increasing their chances of reaching data limits and possible associated service stoppages, incurring overage charges, and the like based at least in part on a type of data communication (i.e., non-tethered) for which they may well be paying for an unlimited data plan and (ii) having to disable their tethering function (for which they may very well pay an extra fee each billing period) whenever they want to engage in the (perhaps unlimited) non-tethering data communication to which their data plan entitles them. Furthermore, it is likely that a great many subscribers are "choosing" the former by being unaware of these nuances, perhaps reasonably assuming that the unlimited non-tethered data communication for which they pay is in actuality being provided to them.

The present methods and systems use transport-layer source ports to identify sources of packet payloads—as being, at a minimum, either tethering or non-tethering data communication in mixed tethering and non-tethering environments, such as when a tethering-capable WCD is operating in tethering mode but remains capable of engaging in both tethered and non-tethered data communication while operating in that mode. Thus, the present methods and systems enable wireless-service providers to distinguish between tethered and non-tethered communications in such situations, accordingly store usage records reflective of at least such a distinction, and differentially bill subscribers based at least in part on such records.

One embodiment takes the form of a method of facilitating differential billing among tethered-data and non-tethered-data communications and involves a WCD making a determination as to whether a payload of a data packet that is to be transmitted from the WCD to a WWAN is a tethered-data payload or rather a non-tethered-data payload, where tethered-data payloads are received by the WCD from at least one tethered device and where non-tethered-data payloads originate on the WCD. This embodiment further involves the WCD selecting a transport-layer source port number based at least in part on the determination, modifying the packet at least in part by inserting the selected transport-layer source port number into a header of the packet, and transmitting the modified packet to the WWAN.

Another embodiment takes the form of a WCD having at least one communication interface, at least one processor, and at least one computer-readable medium having stored thereon program instructions executable by the at least one processor for causing the WCD to carry out the steps described in the preceding paragraph.

Yet another embodiment takes the form of a method of facilitating differential billing among tethered-data and non-tethered-data communications and involves a WWAN providing communication service to a WCD arranged according to the preceding two paragraphs. This embodiment further involves the WWAN receiving into a network entity a data packet transmitted to the WWAN from the WCD, reading the transport-layer source port number from the header of the received data packet, and differentially billing for communication of the data packet based at least in part on whether the transport-layer source port number indicates that the payload of the received data packet is a tethered-data or non-tethered-data payload.

These as well as other aspects and advantages will become apparent to those of ordinary skill in the art by reading the following detailed description, with reference where appropriate to the accompanying drawings. Further, it should be understood that the this overview is intended to provide illustrative examples and is not meant by way of limitation.

DETAILED DESCRIPTION OF THE DRAWINGS

1. Example Architecture a. Example Telecommunications System

Figure 1:
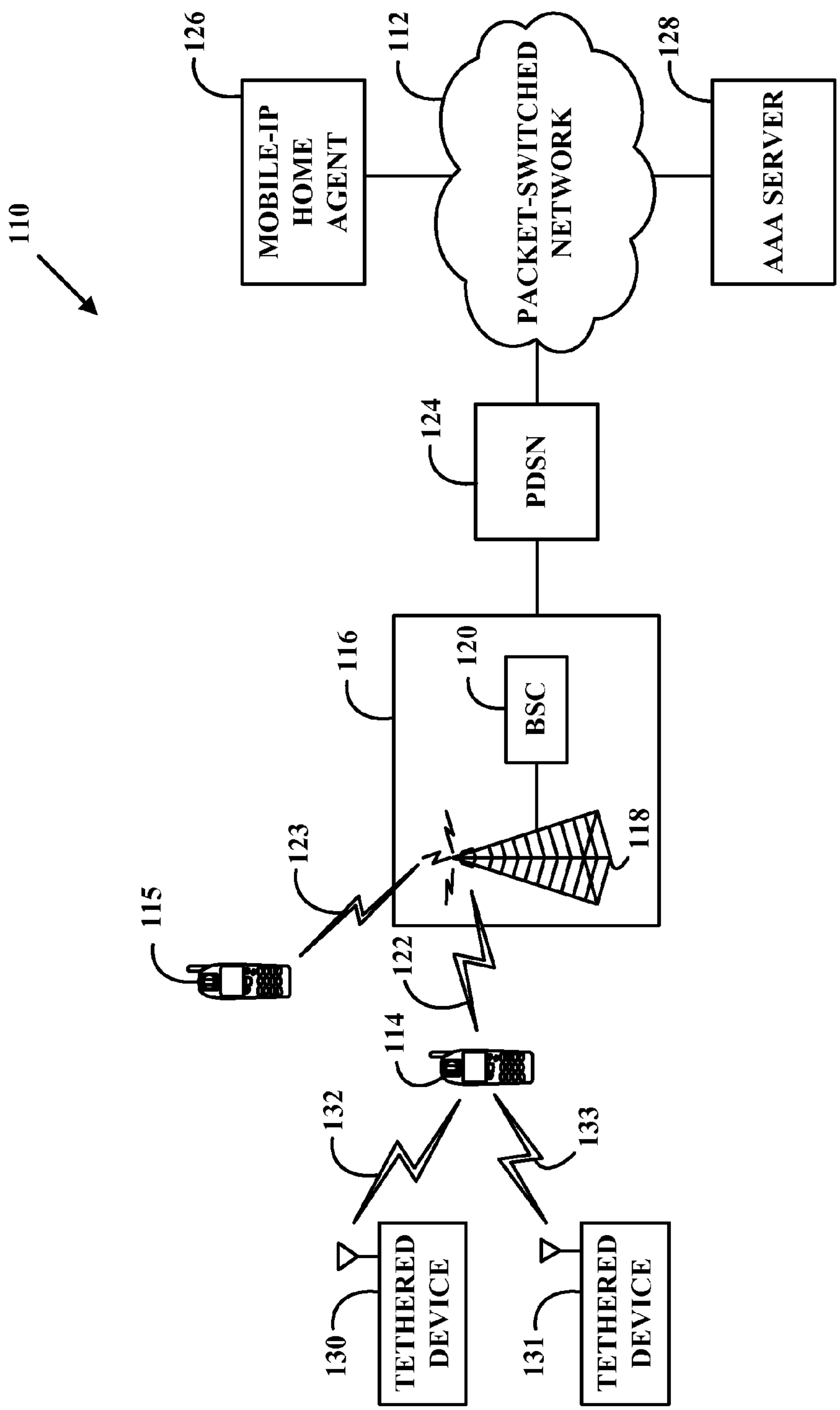
FIG. 1 is a simplified block diagram of an example of a communication system in which at least one embodiment can be carried out.

For simplicity of illustration and by way of example, the present methods and systems are described below with respect to a WCD interacting with elements of a typical WWAN in order to be able to communicate via a packet-data network, as shown in FIG. 1. That arrangement, like others disclosed herein, should not be taken as limiting. The present methods and systems could be applied in other scenarios as well, such as with respect to other packet-data communication systems. Also, any air-interface protocols or specific parameters of arrangements described herein should be considered to be examples and not restrictions.

FIG. 1 is a simplified block diagram of an example of a communication system in which at least one embodiment can be carried out. In the embodiment depicted in FIG. 1, communications system 110 includes a packet-switched network 112, WCDs 114 and 115, WWAN 116 (which includes base transceiver station (BTS) 118 and base station controller (BSC) 120, and with which WCD 114 communicates via air interface 122), PDSN 124, Mobile-IP Home Agent 126, AAA server 128, and tethered devices 130 and 131 (which communicate with WCD 114 via air interfaces 132 and 133, respectively).

Packet-switched network 112 may include one or more wide-area networks and/or one or more local-area networks, as well as one or more public networks (such as the Internet) and/or one or more private networks. Packets may be routed in packet-switched network 112 using the Internet Protocol (IP), and devices in communication with packet-switched network 112 may be identified by a network address, such as an IP address. And Mobile-IP Home Agent 126 may provide Mobile-IP services as is known in the art.

Users (e.g., subscribers) may use WCDs, such as WCDs 114 and 115, to communicate over packet-switched network 112 via WWAN 116 and PDSN 124. Additionally, users may communicate over packet-switched network 112 using tethered devices 130 and 131 by communicating via WCD 114. Furthermore, though FIG. 1 shows two WCDs and two tethered devices, any number of WCDs and any number of tethered devices may be present in a given implementation. WCD 114 is described more fully below in connection with FIG. 2.

Tethered devices 130 and 131 may communicate over packet-switched network 112 by communicating with WCD 114 over respective WLAN connections such as the depicted air interfaces 132 and 133, where WCD 114 in turn communicates with WWAN 116 via a WWAN connection such as the depicted air interface 122. The interfaces 132 and 133 could take any suitable wired (e.g., Universal Serial Bus (USB) and/or wireless (e.g., Wi-Fi (IEEE 802.11)) form, while the interface 122 may conform to any one or more (e.g., 3 G and/or 4 G) WWAN protocols such as code division multiple access (CDMA), time division multiple access (TDMA), Evolution Data Optimized (EV-DO), Global System for Mobile (GSM), WiMAX (IEEE 802.16), Long Term Evolution (LTE), and/or one or other suitable protocols now known or later developed.

WCD 114 may receive communication in a variety of formats and may process the received communication before retransmitting it. Received communication may, for instance, include individual data packets, streams of data packets, and/or streams of data. WCD 114 may process the received communication by, for example, repackaging the received data or data packets into new data packets for transmission. In particular, WCD 114 may include the received communication as a tethered-data payload in a data packet. As another example, WCD 114 may modify the header or data of received communication to conform to a given protocol or standard. In other cases, WCD 114 may send the original communication without any processing. And other suitable options are possible as well.

PDSN 124 may exchange messages via packet-switched network 112 with AAA server 128 according to one or more protocols such as "Remote Authentication Dial In User Service (RADIUS)," RFC 2865 (June 2000) and "RADIUS Accounting," RFC 2866 (June 2000), which are incorporated herein by reference. Other protocols may also be used.

In operation, PDSN 124 may query AAA server 128 to authenticate and authorize requests by WCDs, such as WCD 114, for access to packet-switched network 112. PDSN 124 may also send to AAA server 128 status messages, such as RADIUS Accounting START and STOP messages, regarding the communication status of WCDs. PDSN 124 may send a RADIUS START message when PDSN 124 starts a service period for WCD 114, such as when a new data link is established or when a dormant data link becomes active. In addition, PDSN 124 may send a RADIUS STOP message when a data link with WCD 114 becomes dormant (which may occur when no data traffic to or from WCD 114 occurs for a certain period of time, such as ten seconds) or when a data link with WCD 114 has terminated (which may occur when WCD 114 logs off, powers off, moves out of range, or is inactive for a sufficient period of time), among other examples. RADIUS messages may include UDRs or other usage records generated by PDSN 124 (and/or a data service gateway (DSG) in some embodiments) reflecting the communication status and history of WCDs.

b. Example Wireless Communication Device (WCD)

Figure 2:
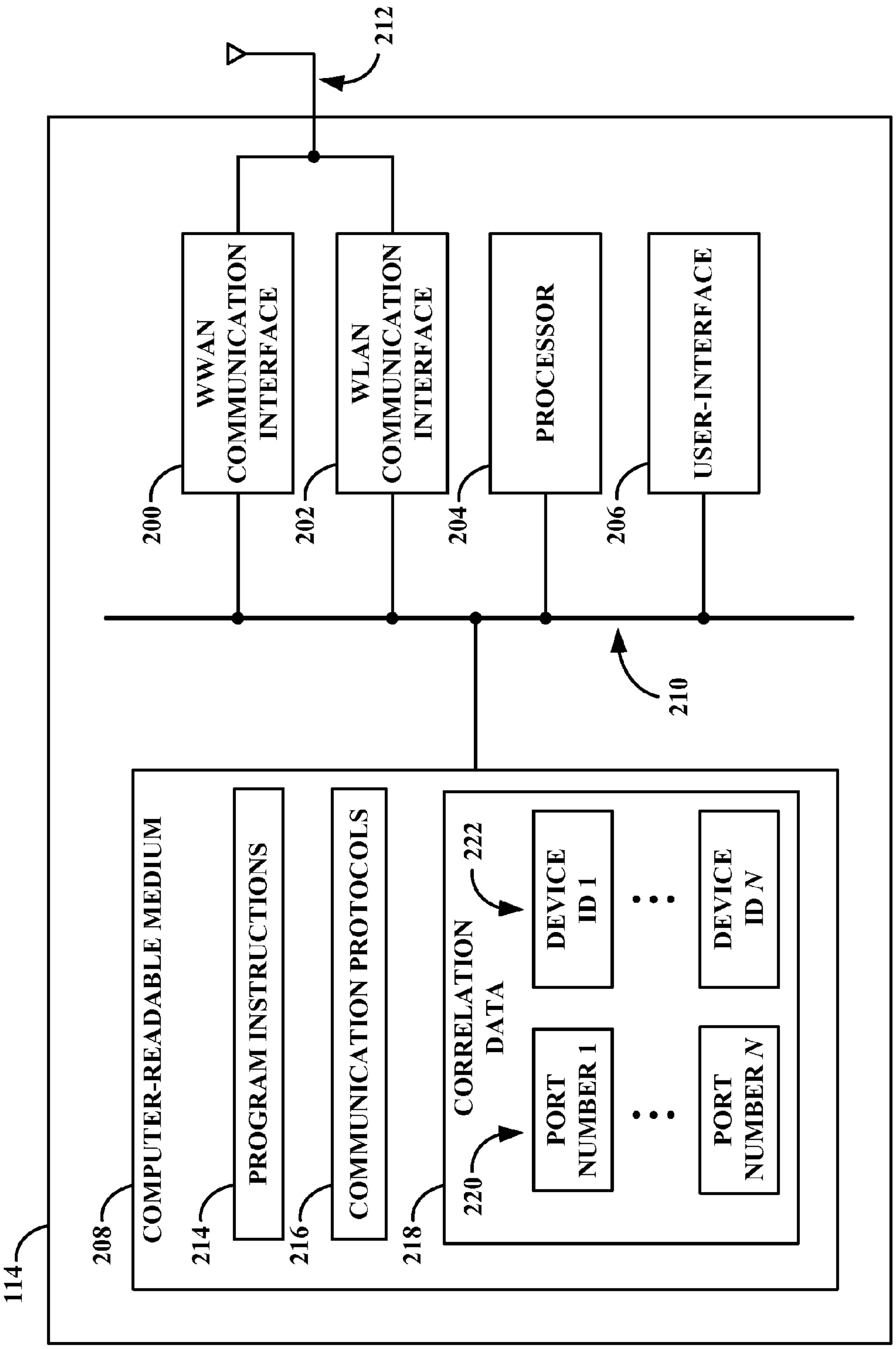
FIG. 2 is a simplified block diagram of an example of a wireless communication device (WCD) in accordance with at least one embodiment.

FIG. 2 is a simplified block diagram of an example of a wireless communication device (WCD) in accordance with at least one embodiment. In the embodiment depicted in FIG. 2, WCD 114 includes a WWAN communication interface 200, a WLAN communication interface 202, a processor 204, a user interface 206, and a computer-readable medium (CRM) 208, all of which may be communicatively linked by a system bus 210.

WWAN communication interface 200 and WLAN communication interface 202 may include wireless-communication hardware and associated logic to enable WCD 114 to engage in communication with network entities and tethered devices, respectively. For example, WWAN communication interface 200 may include a wireless chipset and an associated antenna 212, arranged to connect with network stations such as BTS 118. In some embodiments, WLAN communication interface 202 may also include a wireless chipset and associated antenna 212, arranged to connect with tethered devices 130 and 131. Though FIG. 2 shows interfaces 200 and 202 utilizing the same antenna 212, these interfaces may alternatively utilize separate communication hardware. In some embodiments, WLAN communication interface 202 includes a wired connection chipset and a physical connection port, such as a USB, IEEE 1394, or Ethernet port, among other possible examples.

User interface 206 may include one or more output mechanisms. For instance, user interface 206 may include a display for presenting text-based and/or graphics-based menus or prompts. User interface 206 may also include an audio speaker for playing out audio to users. User interface 206 may also include one or more additional output devices, such as lights, vibration mechanisms, and/or other components that provide outputs discernible to users. Additionally, user-interface 206 may include one or more input mechanisms, such as microphones, keys, buttons, switches, touch screens, and/or other components.

CRM 208 serves to store data, files, and programs, and may take various forms, in one or more parts, such as volatile memory (e.g., RAM) and/or non-volatile memory (e.g., Flash ROM). CRM 208 may store, among other data, program instructions 214, comprising machine-language instructions executable by processor 204 to carry out the various functions described herein. CRM 208 may also include other functional components, such as communication protocols 216 that may include, as examples, transmission-control protocol (TCP), user-datagram protocol (UDP), Session Initiation Protocol (SIP), and/or one or more other suitable communication protocols, such as one or more protocols mentioned herein, and/or one or more other suitable protocols now known or later developed.

In an example WCD, CRM 208 may also include correlation data 218 that associates a set of transport-layer (e.g., TCP and/or UDP) source port numbers 220 ("Port Number 1" to "Port Number N") with a set of device identifiers 222 ("Device ID 1" to "Device ID N"). Each port number 220 may be a numerical identifier, typically 16 bits long. Each device identifier 222 may take any form that includes one or more identifiers that individually and/or collectively uniquely identify various respective tethered devices. As examples, each device identifier 222 may include one or more of an electronic serial number (ESN), a Media Access Control (MAC) address, and/or one or more of any other suitable device identifier. Thus, WCD 114 may store one device identifier 222 identifying tethered device 130, another device identifier 222 identifying tethered device 131, and yet another device identifier 222 identifying itself (i.e., WCD 114, so as to be able to, as but one example, identify non-tethering data).

Additionally or alternatively, device identifiers 222 may identify types of devices or interfaces, instead of specific devices. For example, WCD 114 may store one device identifier 222 that indicates tethered data (without identifying a specific tethered device) and another device identifier 222 that generally indicates non-tethered data. As another example, WCD 114 may store a device identifier 222 identifying that a given tethered device is a laptop computer (e.g., without uniquely identifying one tethered laptop computer from another), and likewise with tablets, cell phones, etc. And other examples are possible as well.

In some embodiments, a port number 220 stored in correlation data 218 may indicate multiple characteristics of a payload-data source. For example, a port number may indicate any one or any combination of tethered (or non-tethered) data, device type, device-specific identifier(s), device application from which the payload data originated, and the like.

c. Example Network Entity

Figure 3:
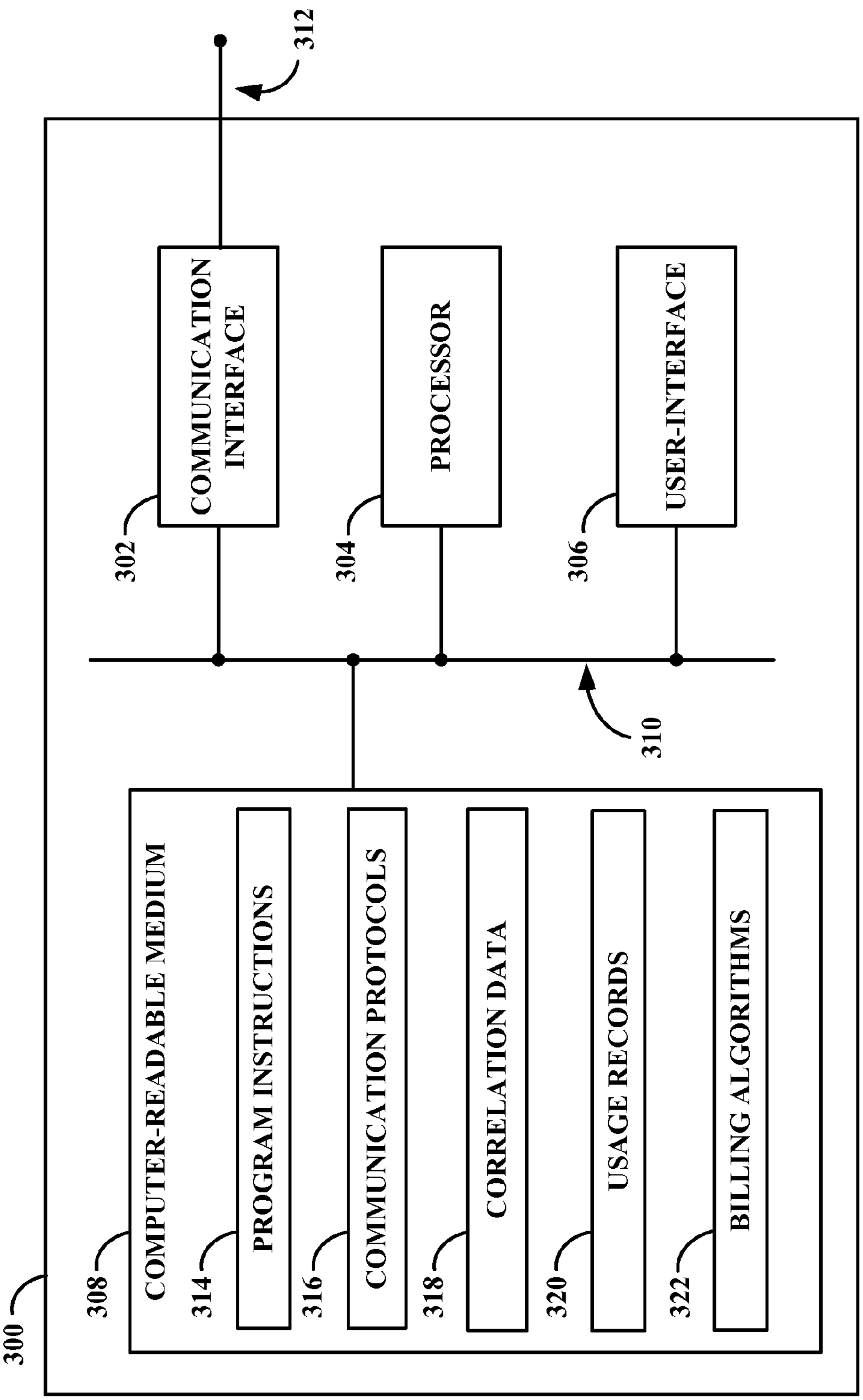
FIG. 3 is a simplified block diagram of an example of a network entity in accordance with at least one embodiment.

FIG. 3 is a simplified block diagram of an example of a network entity in accordance with at least one embodiment In the embodiment depicted in FIG. 3, network entity 300—which could be a PDSN and/or DSG, as examples—includes a communication interface 302, a processor 304, a user interface 306, and a CRM 308, all connected by connection (e.g., bus) 310, which may include wireless and/or wired portions. Additionally, network entity 300 may include an external connection 312 for connecting and communicating with other devices and network systems.

CRM 308 stores communication program instructions 314 executable by processor 304 for carrying out the various network-entity functions described herein. CRM 308 also stores communication protocols 316 for facilitating communication between network entity 300 and other devices and/or systems in accordance with the described embodiments. As further depicted in FIG. 3, CRM 308 also stores correlation data 318 (which may be substantially similar to correlation data 218, though may well include such data in connection with multiple different WCDs), usage records (e.g., UDRs) 320, and billing algorithms (e.g., billing rates, formulas, and the like) 322.

2. Example Operation a. Modifying and Sending Data Packets

Figure 4:
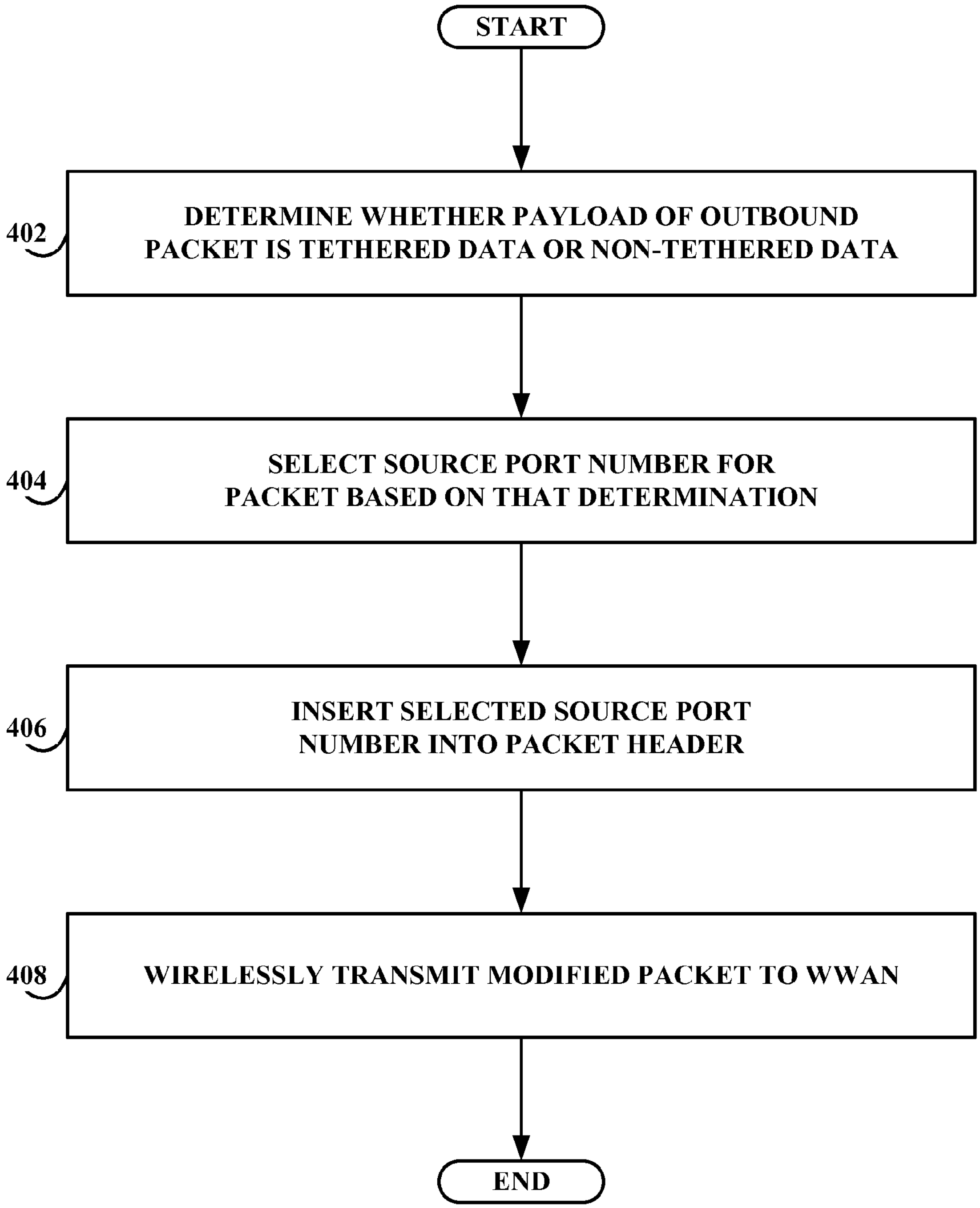
FIG. 4 is a flow chart depicting a first example method in accordance with at least one embodiment.

FIG. 4 is a flow chart depicting a first example method in accordance with at least one embodiment. In particular, FIG. 4 depicts a method 400 of facilitating differential billing among tethered-data and non-tethered-data communications that may be carried out by a WCD such as WCD 114, though this is by way of example only.

At step 402, WCD 114 makes a determination as to whether a payload of a data packet that is to be transmitted from WCD 114 to WWAN 116 is a tethered-data payload or rather a non-tethered-data payload, where tethered-data payloads are received by the WCD from at least one tethered device and where non-tethered-data payloads originate on the WCD.

At step 404, WCD 114 selects a transport-layer source port number based at least in part on the determination made in step 402.

In at least one embodiment, WCD 114 maintains correlation data that associates a first set of one or more transport-layer port numbers with tethered-data communication and further associates a second set of one or more transport-layer port numbers with non-tethered-data communication, where the first and second sets are mutually exclusive; in accordance with this at least one embodiment, WCD 114 selecting the transport-layer source port number based at least in part on the determination comprises (i) selecting as the transport-layer source port number a transport-layer port number from the first set when the determination is that the payload is a tethered-data payload and (ii) selecting as the transport-layer source port number a transport-layer port number from the second set when the determination is that the payload is a non-tethered-data payload.

In at least one embodiment, WCD 114 updates the correlation data and transmits the updated correlation data to at least one network entity on WWAN 116. In at least one embodiment, WCD 114 engages in tethering communication with a particular tethered device and accordingly updates the correlation data to include a particular association between (i) at least one identifier of the particular tethered device and (ii) a particular transport-layer port number from the first set; WCD 114 may then receive a particular payload from the particular tethered device and responsively modify a particular data packet containing the particular payload at least in part by referencing the particular association and accordingly inserting the particular transport-layer port number into a header of the particular data packet. WCD 114 may then transmit the modified particular data packet to WWAN 116. In at least one embodiment, WCD 114 conveys the particular association to at least one network entity on WWAN 116 to facilitate differential billing among different tethered devices engaging in data communication with WWAN 116 via WCD 114.

At step 406, WCD 114 modifies the data packet at least in part by inserting the selected transport-layer source port number into a header of the data packet. At step 408, WCD 114 transmits the modified data packet to WWAN 116.

b. Detecting Communication and Differentially Billing

Figure 5:
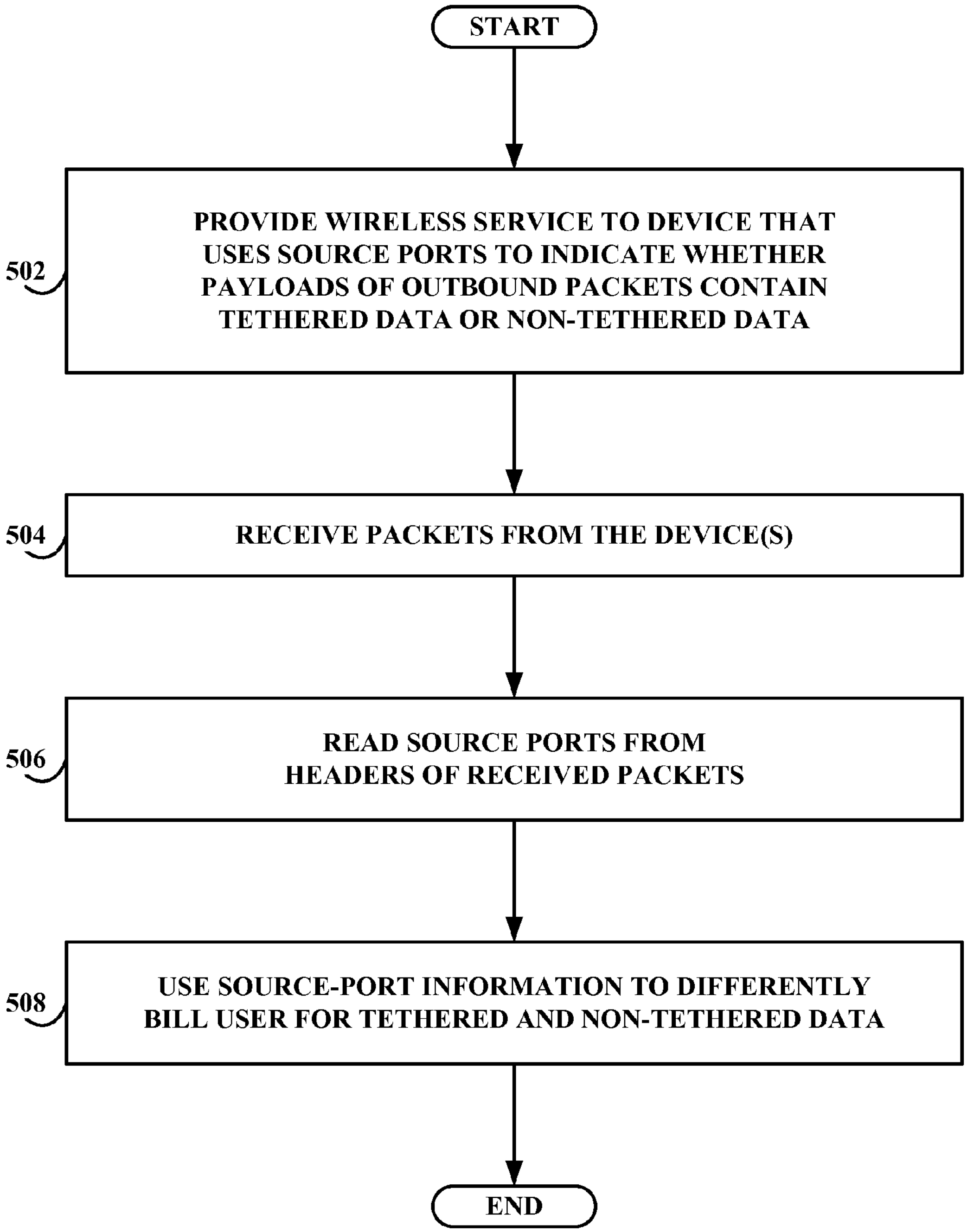
FIG. 5 is a flow chart depicting a second example method in accordance with at least one embodiment.

FIG. 5 is a flow chart depicting a second example method in accordance with at least one embodiment. In particular, FIG. 5 depicts a method 500 of facilitating differential billing among tethered-data and non-tethered-data communications that may be carried out by a WWAN such as WWAN 116, though this is by way of example only.

At step 502, WWAN 116 provides communication service to a wireless communication device (WCD), wherein the WCD has logic for (i) making a determination as to whether a payload of a data packet that is to be transmitted from the WCD to the WWAN is a tethered-data payload or rather a non-tethered-data payload, wherein tethered-data payloads are received by the WCD from a tethered device and wherein non-tethered-data payloads originate on the WCD, (ii) selecting a transport-layer source port number based at least in part on the determination, (iii) modifying the data packet at least in part by inserting the selected transport-layer source port number into a header of the data packet, and (iv) transmitting the modified data packet to the WWAN;

At step 504, WWAN 116 receives the transmitted data packet into network entity 300, which takes the form of PDSN 124 in at least one embodiment.

At step 506, WWAN 116 reads the transport-layer source port number from the header of the received data packet.

In at least one embodiment, WWAN 116 determines based at least in part on the read transport-layer source port number that communication of the data packet from WCD 114 to a network destination on WWAN 116 is not authorized by WWAN 116. In at least one such embodiment, WWAN 116 responsively carries out one or more of the following responsive actions: (i) charging a penalty (to, e.g., the subscriber associated with WCD 114) for the unauthorized packet; (ii) not forwarding the unauthorized packet to the network destination; and (iii) directing WCD 114 to discontinue communication of data from at least one particular tethered device.

At step 508, WWAN 116 differentially bills for communication of the data packet based at least in part on whether the read transport-layer source port number indicates that the payload of the received data packet is a tethered-data payload or a non-tethered-data payload.

In at least one embodiment, WWAN 116 maintains correlation data, that associates a first set of one or more transport-layer port numbers with tethered-data communication and further associates a second set of one or more transport-layer port numbers with non-tethered-data communication, where the first and second sets are mutually exclusive, and where differentially billing for communication of the data packet involves (i) applying a first billing algorithm when the read transport-layer source port number is from the first set and (ii) applying a second billing algorithm different than the first billing algorithm when the read transport-layer source port number is from the second set.

In at least one embodiment, applying the first billing algorithm involves charging the communication to an account associated with a device from which the WCD received the payload, and applying the second billing algorithm involves charging the communication to an account associated with the WCD.

In at least one embodiment, applying the first billing algorithm involves charging the communication to an account associated with the WCD at a first charging rate; and applying the second billing algorithm involves charging the communication to the account associated with the WCD at a second charging rate different from the first charging rate. In at least one embodiment, the first rate is greater than zero and the second rate is zero.

In at least one embodiment, WCD 114 further has logic for updating the correlation data and transmitting the updated correlation data to network entity 300; in at least one such embodiment, WWAN 116 receives (e.g., into network entity 300) the updated correlation data; and WWAN 116 also differentially bills for communication of at least one data packet based at least in part on the received updated correlation data.

In at least one such embodiment, WCD 114 further includes logic for (i) updating the correlation data to include a particular association between at least one identifier of a particular tethered device and a particular transport-layer port number from the first set, (ii) conveying the particular association to network entity 300, and (iii) receiving a particular payload from the particular tethered device and responsively modifying a particular data packet containing the particular payload at least in part by referencing the particular association and accordingly inserting the particular transport-layer port number into a header of the particular data packet. In such embodiments, differentially billing for communication of the modified particular data packet may be based at least in part on the conveyed particular association.

In at least one embodiment, WWAN 116 receives into a network entity (such as network entity 300) inbound data packets that each (i) are addressed to WCD 114 and (ii) have a header containing a respective transport-layer destination port number. WWAN 116 may then use the transport-layer destination port numbers to differentially bill a subscriber associated with WCD 114 for the inbound data packets as tethered or non-tethered data.

3. Conclusion

Various examples of embodiments have been described above. Those skilled in the art will understand, however, that changes and modifications may be made to those examples without departing from the scope of the claims.

We claim:

1. A method of facilitating differential billing among tethered-data and non-tethered-data communications, the method comprising:

a wireless communication device (WCD) maintaining correlation data that associates a first set of one or more transport-layer port numbers with tethered-data communication and further associates a second set of one or more transport-layer port numbers with non-tethered-data communication, wherein the first and second sets are mutually exclusive;

the WCD making a determination as to whether a payload of a data packet that is to be transmitted from the WCD to a wireless wide-area network (WWAN) is a tethered-data payload or rather a non-tethered-data payload, wherein tethered-data payloads are received by the WCD from at least one tethered device and wherein non-tethered-data payloads originate on the WCD;

the WCD selecting a transport-layer source port number based at least in part on the determination, wherein selecting the transport-layer source port number based at least in part on the determination comprises (i) selecting as the transport-layer source port number a transport-layer port number from the first set if the determination is that the payload is a tethered-data payload and (ii) selecting as the transport-layer source port number a transport-layer port number from the second set if the determination is that the payload is a non-tethered-data payload;

the WCD modifying the data packet at least in part by inserting the selected transport-layer source port number into a header of the data packet;

the WCD transmitting the modified data packet to the WWAN; and the WCD updating the correlation data and transmitting the updated correlation data to at least one network entity on the WWAN.

2. A method of facilitating differential billing among tethered-data and non-tethered-data communications, the method comprising:

a wireless communication device (WCD) maintaining correlation data that associates a first set of one or more transport-layer port numbers with tethered-data communication and further associates a second set of one or more transport-layer port numbers with non-tethered-data communication, wherein the first and second sets are mutually exclusive;

the WCD engaging in tethered-data communication with a particular tethered device and, based on the communication with the particular tethered device being tethered-data communication rather than non-tethered-data communication, the WCD updating the correlation data to include a particular association between (i) at least one identifier of the particular tethered device and (ii) a particular transport-layer port number from the first set;

the WCD receiving a particular payload from the particular tethered device and responsively modifying a particular data packet containing the particular payload at least in part by referencing the particular association and accordingly inserting the particular transport-layer port number into a header of the particular data packet; and the WCD transmitting the modified particular data packet to the WWAN.

3. The method of claim 2, further comprising the WCD conveying the particular association to at least one network entity on the WWAN to facilitate differential billing among different tethered devices engaging in data communication with the WWAN via the WCD.

4. A wireless communication device (WCD) comprising:

at least one communication interface;

at least one processor; and at least one computer-readable medium having stored thereon correlation data that associates a first set of one or more transport-layer port numbers with tethered-data communication and further associates a second set of one or more transport-layer port numbers with non-tethered-data communication, wherein the first and second sets are mutually exclusive, the at least one computer-readable medium further having stored thereon program instructions executable by the at least one processor for causing the WCD to carry out a set of functions, the set of functions comprising:

a) making a determination as to whether a payload of a data packet that is to be transmitted from the WCD to a wireless wide-area network (WWAN) is a tethered-data payload or rather a non-tethered-data payload, wherein tethered-data payloads are received by the WCD from at least one tethered device and wherein non-tethered-data payloads originate on the WCD, b) selecting a transport-layer source port number based at least in part on the determination, wherein selecting the transport-layer source port number based on the determination comprises (i) selecting as the transport-layer source port number a transport-layer port number from the first set if the determination is that the payload is a tethered-data payload and (ii) selecting as the transport-layer source port number a transport-layer port number from the second set if the determination is that the payload is a non-tethered-data payload, c) modifying the data packet at least in part by inserting the selected transport-layer source port number into a header of the data packet, and d) transmitting the modified data packet to the WWAN, wherein, when the WCD engages in tethered-data communication with a particular tethered device, the WCD accordingly updates the correlation data to include a particular association between (i) at least one identifier of the particular tethered device and (ii) a particular transport-layer port number from the first set, and wherein when the WCD receives particular payload from the particular tethered device, the WCD (ii) responsively modifies a particular data packet containing the particular payload at least in part by referencing the particular association and accordingly inserting the particular transport-layer port number into a header of the particular data packet, and (iii) transmits the modified particular data packet to the WWAN.

5. The WCD of claim 4, the set of functions further comprising conveying the particular association to at least one network entity on the WWAN to facilitate differential billing among different tethered devices engaging in data communication with the WWAN via the WCD.

6. A method of facilitating differential billing among tethered-data and non-tethered-data communications, the method comprising:

a wireless wide-area network (WWAN) providing communication service to a wireless communication device (WCD), wherein the WCD has logic for (i) making a determination as to whether a payload of a data packet that is to be transmitted from the WCD to the WWAN is a tethered-data payload or rather a non-tethered-data payload, wherein tethered-data payloads are received by the WCD from a tethered device and wherein non-tethered-data payloads originate on the WCD, (ii) selecting a transport-layer source port number based at least in part on the determination, (iii) modifying the data packet at least in part by inserting the selected transport-layer source port number into a header of the data packet, and (iv) transmitting the modified data packet to the WWAN;

the WWAN receiving into a network entity the transmitted data packet;

the WWAN reading the transport-layer source port number from the header of the received data packet; and the WWAN differentially billing for communication of the data packet based at least in part on whether the read transport-layer source port number indicates that the payload of the received data packet is a tethered-data payload or rather a non-tethered-data payload.

7. The method of claim 6, further comprising the WWAN maintaining correlation data, wherein the correlation data associates a first set of one or more transport-layer port numbers with tethered-data communication and further associates a second set of one or more transport-layer port numbers with non-tethered-data communication, wherein the first and second sets are mutually exclusive, and wherein differentially billing for communication of the data packet comprises:

applying a first billing algorithm when the read transport-layer source port number is from the first set, and applying a second billing algorithm different than the first billing algorithm when the read transport-layer source port number is from the second set.

8. The method of claim 7, wherein:

applying the first billing algorithm comprises charging the communication to an account associated with a device from which the WCD received the payload, and applying the second billing algorithm comprises charging the communication to an account associated with the WCD.

9. The method of claim 7, wherein:

applying the first billing algorithm comprises charging the communication to an account associated with the WCD at a first charging rate; and applying the second billing algorithm comprises charging the communication to the account associated with the WCD at a second charging rate different from the first charging rate.

10. The method of claim 9, wherein the first charging rate is greater than zero, and wherein the second charging rate is zero.

11. The method of claim 7, wherein the WCD further has logic for updating the correlation data and transmitting the updated correlation data to the network entity, the method further comprising:

the WWAN receiving into the network entity the updated correlation data; and the WWAN differentially billing for communication of at least one data packet based at least in part on the received updated correlation data.

12. The method of claim 11, wherein the WCD further includes logic for (i) updating the correlation data to include a particular association between at least one identifier of a particular tethered device and a particular transport-layer port number from the first set, (ii) conveying the particular association to the network entity, and (iii) receiving a particular payload from the particular tethered device and responsively modifying a particular data packet containing the particular payload at least in part by referencing the particular association and accordingly inserting the particular transport-layer port number into a header of the particular data packet, and wherein differentially billing for communication of the modified particular data packet is based at least in part on the conveyed particular association.

13. The method of claim 6, further comprising the WWAN determining based at least in part on the read transport-layer source port number that communication of the data packet from the WCD to a network destination on the WWAN is not authorized by the WWAN.

14. The method of claim 13, further comprising charging a penalty for the unauthorized packet.

15. The method of claim 13, wherein the WWAN does not forward the unauthorized packet to the network destination.

16. The method of claim 13, further comprising directing the WCD to discontinue communication of data from at least one particular tethered device.

17. The method of claim 6, further comprising:

receiving into a network entity inbound data packets that each (i) are addressed to the WCD and (ii) have a header containing a respective transport-layer destination port number; and using the transport-layer destination port numbers to differentially bill a subscriber associated with the WCD for the inbound data packets as tethered or non-tethered data.

* * * * *